June 7, 1938. E. S. PRESTON 2,120,220
HEATING APPLIANCE
Filed Aug. 2, 1937
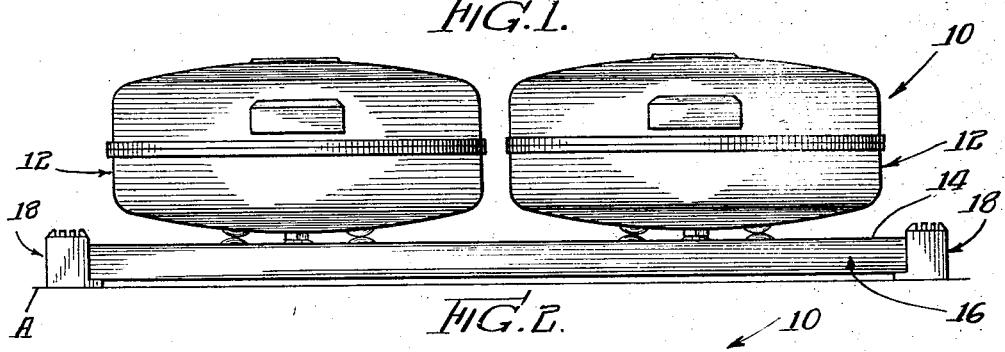
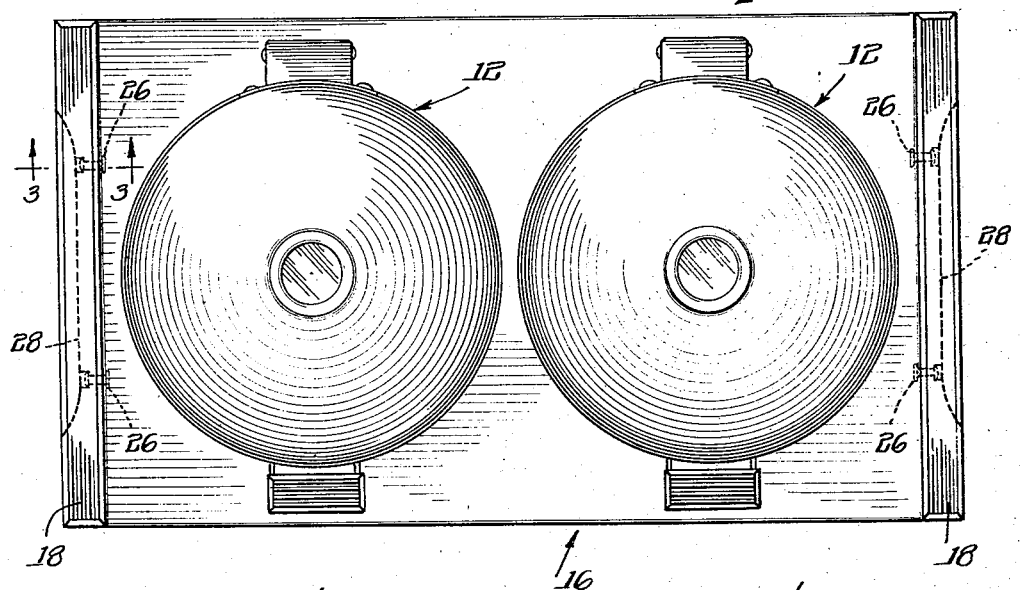
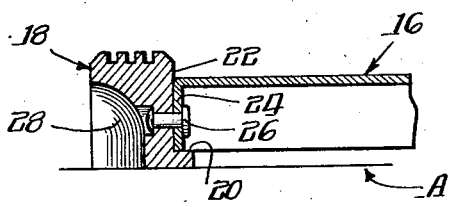
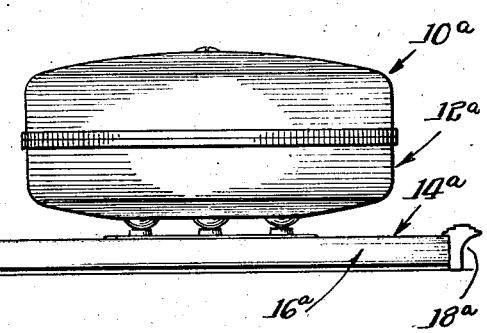
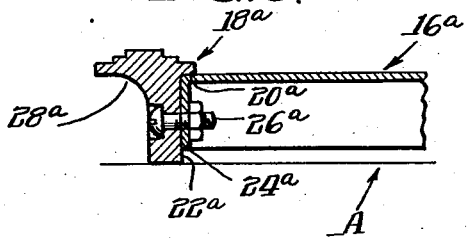
Inventor
Edward S. Preston
By:- Cox & Moore attys.

Patented June 7, 1938

2,120,220

UNITED STATES PATENT OFFICE 2,120,220

HEATING APPLIANCE

Edward S. Preston, Hinsdale, Ill., assignor to Chicago Electric Manufacturing Company, Chicago, Ill., a corporation of Illinois Application August 2, 1937, Serial No. 156,867

4 Claims. (Cl. 65—61)

This invention relates generally to heating appliances, and more particularly to handle structures for such appliances.

Heating appliances such as electrically heated waffle irons, sandwich toasters, and the like are frequently mounted upon trays. These trays are usually metallic, and, due to their direct association with the heated unit, they absorb considerable heat. The outer surface of such trays frequently has a high luster produced by chromium plating or the like. The present invention contemplates the provision of a new and improved handle construction, which is a non-conductor of heat, particularly adapted for trays of the type referred to above, and which will enable the tray when hot to be easily manipulated, and which will minimize the possibility of the user's fingers coming into contact with the bright, polished surface or top of the tray.

The invention also contemplates a heating appliance equipped with a handle structure which will serve the dual function of facilitating the manipulation of the tray, as referred to above, and as a foot to prevent direct contact of the metallic tray with a supporting surface, for example, a table top.

More specifically, the invention contemplates a handle construction, as set forth above, which is particularly adapted to be applied along the oppositely disposed straight end surfaces of a metallic tray, and to this end I propose to interlock a handle, which is substantially a non-conductor of heat, with each oppositely disposed depending end flange of the tray.

The foregoing and other objects and advantages will be more apparent from the following detail description when considered in connection with the accompanying drawing, wherein—

Figure 1 is a front elevational view of a heating appliance, to-wit, a waffle iron having the tray thereof provided with a handle construction representing one embodiment of the present invention;

Figure 2 is a plan view of the device shown in Figure 1;

Figure 3 is an enlarged transverse sectional view across one of the handles and adjacent structure of the tray, said view being taken substantially along the line 3—3 of Figure 2;

Figure 4 is a front elevational view of a waffle iron and its associated tray equipped with a modified handle construction contemplated by the present invention; and Figure 5 is an enlarged fragmentary transverse sectional view disclosing the manner in which the handles shown in Figure 4 are secured to the metallic tray.

Referring now to the drawing more in detail wherein like numerals have been employed to designate similar parts throughout the various views, it will be seen that for the purpose of illustrating one practical embodiment of the invention I have illustrated in Figures 1 and 2 a heating appliance designated generally by the numeral 10. This appliance includes a pair of electrically heated waffle irons 12, which are supported on the upper surface 14 of a metallic tray 16. Along oppositely disposed ends of the tray 16 I provide handles 18 preferably made of non-heat conducting material, such as wood, fiber, or the like.

Each of the handles 18 (Figures 1 to 3, inclusive) is longitudinally recessed along its inner side so as to provide an abutment or shoulder 20, and a vertical bearing surface 22. The surface 22 is held flush against the complementary surface of a depending flange 24 of the tray 16 (Figure 3) through the agency of a suitable fastening means, such as rivets 26. The flange 24 is not only firmly held against the vertical surface 22, but is also secured against the shoulder 20. This construction enables the handles 18 to be firmly secured to the tray, and permits the lower portion of each handle to extend sufficiently below the depending flange portion of the tray so as to prevent physical engagement of the tray with a supporting surface, for example, a table top or the like, which is indicated by the horizontal line A in Figures 1 and 3. In other words, the lower portion of each of the handles 18 provides feet which support the metallic tray in spaced relation to the surface A.

A suitable finger receiving recess 28 extends along the outer side of each handle. This serves to facilitate gripping of the handle.

Due to the direct association of the metallic tray with the waffle irons, considerable heat is absorbed by the tray. Hence the handles 18 enable the heating appliance to be manipulated without the possibility of the user's fingers coming into contact with the heated tray. Not only do these handles serve to facilitate handling of a heated tray, but also to prevent the user's fingers from contacting the upper surface 16 of the tray. This surface 16 is highly polished, it being preferably a surface provided by chromium plating or the like. Hence, it is desirable to prevent the surface 16 from being finger marked, and the handle structure just described reduces to a minimum the possibility of soiling the tray surface.

In Figure 4 I have disclosed a heating appliance designated generally by the numeral 10a, which includes a waffle iron 12a, and a tray 16a having a polished or chromium plated top surface 14a. Handles 18a are provided along the straight oppositely disposed end surfaces of the tray 16a. Referring to the enlarged sectional view shown in Figure 5, it will be seen that the handle 18a is longitudinally recessed so as to provide a shoulder 20a and a vertical surface 22a. The depending flange 24a of the tray 16a is firmly clamped against the surface 22a through the agency of a suitable fastening or clamping means, such as the screw 26a. This fastening means 26a serves to interlock the upper corner of the tray firmly against the shoulder 20a in the same way that the fastener 26 of Figure 3 serves to interlock the handle 18 with the depending flange 24, the only difference being that the shoulder in Figure 5 is positioned along the upper portion of the handle 18a, whereas the shoulder 20a is positioned along the lower portion of the handle 18. A suitable longitudinal finger receiving recess 28a is provided along the outer side of the handle 18a. It will also be noted that the handle 18a projects sufficiently below the depending flange structure of the tray so as to prevent physical engagement of this metallic flange with a supporting surface A indicated by the line in Figure 5.

From the foregoing it will be apparent that my invention contemplates an improved handle construction for heating appliances and particularly heating appliances of the type which incorporates a metallic tray of the kind disclosed herein. The handles are designed for convenient attachment to the depending flange structure of the tray, and effectively serve to prevent the user's fingers from coming into contact with the tray. The particular longitudinally recessed arrangement along the inner sides of the handles provides an effective interlock for the tray and handle. With this construction, each handle has the dual function of a handle and a foot, the fasteners serving to positively hold the tray and handle in interlocked relation. The handles in the vicinity of the apertures through which the fastening members extend are preferably countersunk so as to position the fastener head within the body of the handle. By this construction no obstruction to the user's fingers is presented by the fastener heads.

Although for purposes of illustration certain specific embodiments of the invention have been disclosed herein, it will be apparent that modifications and changes of the structures herein disclosed may be made without departing from the spirit and scope of the appended claims.

Having thus described my invention, what I claim as new and desire to secure by Letters Patent is:

1. In combination with a metallic tray of a heating appliance having end abutment flanges, a handle construction including handle members disposed at the ends of said tray along said abutment flanges, each of said handle members having its inner surface shaped to conform to the outer surface of its cooperating abutment flange and a lower laterally extending shoulder extending inwardly and underneath said abutment flange, and fastening means for securing the handle members and the shoulders thereon firmly against the abutment flanges.

2. In combination with a metallic tray of a heating appliance having depending end flange sections, a handle construction including handle members disposed at the ends of said tray along said flange sections, each of said handle members having its inner surface shaped to conform to the outer surface of its cooperating depending flange section and a lower laterally extending shoulder extending inwardly and underneath said flange section, and fastening means for securing the handle members and the shoulders thereon firmly against the flange sections.

3. In combination with a metallic tray of a heating appliance having a horizontal section and depending end flange sections, said depending flange sections being substantially vertically disposed and being joined to the horizontal tray section to provide a sharp right-angular corner portion, a handle construction including oppositely disposed handle members arranged along said depending end flange sections, each of said handle members having an inner vertically disposed bearing surface adapted to engage its cooperating vertically disposed depending flange section and a laterally extending shoulder projecting inwardly toward the center of the tray and engageable with the edge of said flange section, and horizontally extending fastening means projecting through said handles and said depending flange sections for holding the vertically disposed bearing surface and the shoulder of each handle member firmly against its depending flange section, and a portion of each handle being arranged to extend below the depending flange section to provide tray supporting feet.

4. In combination with a metallic tray of a heating appliance having a horizontal section and depending end flange sections, said depending flange sections being substantially vertically disposed and being joined to the horizontal tray section to provide a sharp right-angular corner portion, a handle construction including oppositely disposed handle members arranged along said depending end flange sections, each of said handle members having an inner vertically disposed bearing surface adapted to engage its cooperating vertically disposed depending flange section and a laterally extending shoulder projecting inwardly toward the center of the tray and engageable with the edge of said flange section, and horizontally extending fastening means projecting through said handles and said depending flange sections for holding the vertically disposed bearing surface and the shoulder of each handle member firmly against its depending flange section, the outer surface of each of said handle members being shaped to provide an upwardly and outwardly curved handle portion, said fastening means being recessed into said curved surfaces, and a portion of each handle being arranged to extend below the depending flange section to provide tray supporting feet.

EDWARD S. PRESTON.